United States Patent
Kuwashiro

(10) Patent No.: US 9,557,544 B2
(45) Date of Patent: Jan. 31, 2017

(54) ZOOM LENS AND IMAGE PICKUP APPARATUS INCLUDING ZOOM LENS

(71) Applicant: CANON KABUSHIKI KAISHA, Tokyo (JP)

(72) Inventor: Shin Kuwashiro, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/284,263

(22) Filed: May 21, 2014

(65) Prior Publication Data

US 2014/0347523 A1    Nov. 27, 2014

(30) Foreign Application Priority Data

May 23, 2013  (JP) .................. 2013-108835

(51) Int. Cl.
    *G02B 15/14*    (2006.01)
    *G02B 15/177*   (2006.01)

(52) U.S. Cl.
    CPC .................... *G02B 15/177* (2013.01)

(58) Field of Classification Search
    CPC ... G02B 13/009; G02B 15/177; G02B 15/161; G02B 15/17; G02B 3/14; G02B 9/12
    USPC .................. 359/676, 691
    See application file for complete search history.

(56) References Cited

U.S. PATENT DOCUMENTS

| | | | |
|---|---|---|---|
| 8,934,176 B2* | 1/2015 | Yamagami | G02B 27/646 359/684 |
| 9,097,881 B2* | 8/2015 | Yamagami | G02B 15/177 |
| 2012/0162776 A1* | 6/2012 | Nanba | G02B 15/177 359/682 |
| 2012/0176529 A1* | 7/2012 | Matsuo et al. | 348/345 |
| 2012/0327276 A1 | 12/2012 | Ono et al. | |

FOREIGN PATENT DOCUMENTS

| | | |
|---|---|---|
| CN | 1153912 | 7/1997 |
| CN | 102540433 A | 7/2012 |
| JP | 8-320435 A | 12/1996 |
| JP | H09-211327 A | 8/1997 |
| JP | 2006-133370 A | 5/2006 |
| JP | 2006-350027 A | 12/2006 |
| JP | 2009-204699 A | 9/2009 |
| JP | 2010-091948 A | 4/2010 |
| JP | 2011-247922 A | 12/2011 |

* cited by examiner

*Primary Examiner* — Alicia M Harrington

(74) *Attorney, Agent, or Firm* — Canon USA Inc., IP Division

(57) ABSTRACT

A zoom lens includes, in order from object side to image side, a first lens unit having a negative refractive power and a second lens unit having a positive refractive power. During zooming, the first lens unit and the second lens unit move so that the distance between the first lens unit and the second lens unit changes. The first lens unit includes at least one positive lens and at least one negative lens. The total length of the zoom lens at the wide angle end, the back focal length at the wide angle end, the focal length of the zoom lens at the telephoto end, the focal length of the first lens unit, the focal length of the second lens unit, and the refractive index of the material of the at least one positive lens included in the first lens unit are each appropriately set according to mathematical conditions.

8 Claims, 17 Drawing Sheets

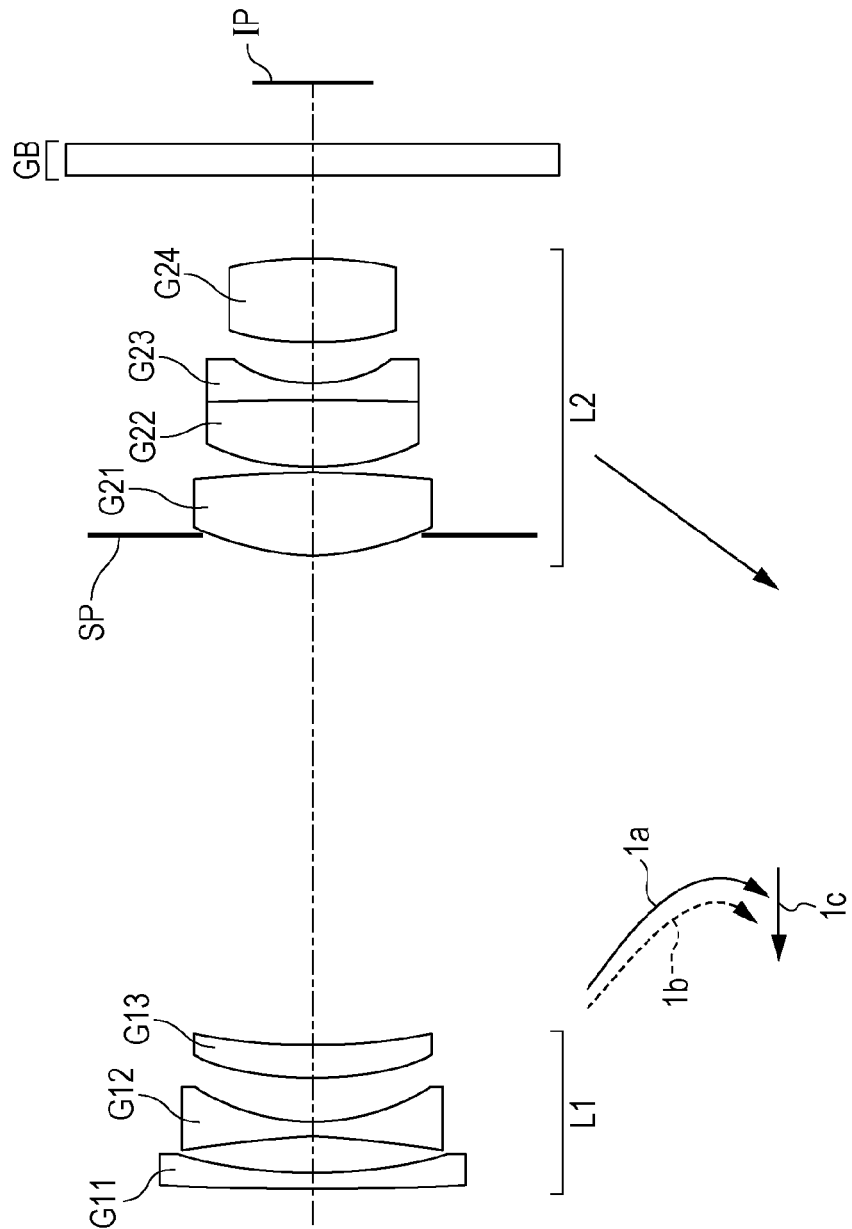

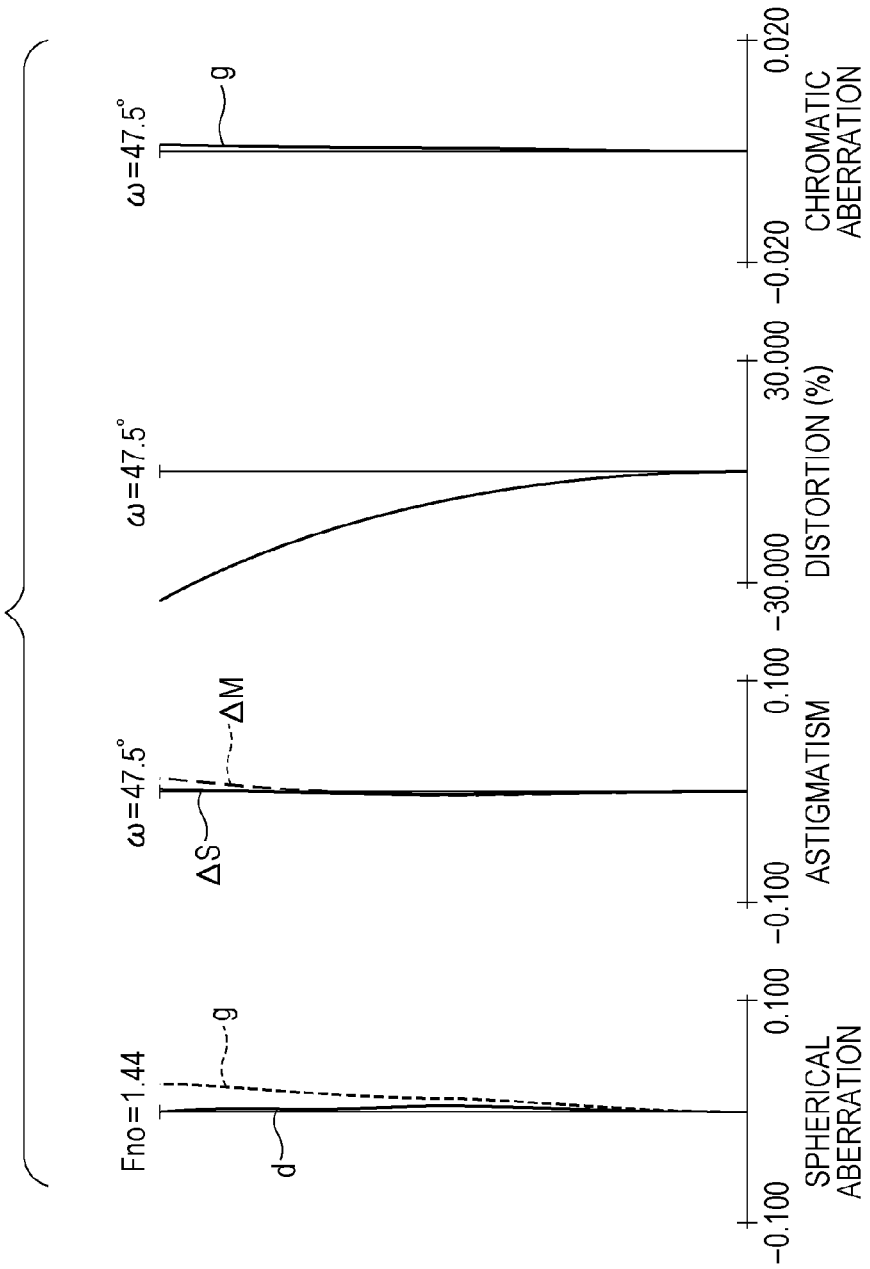

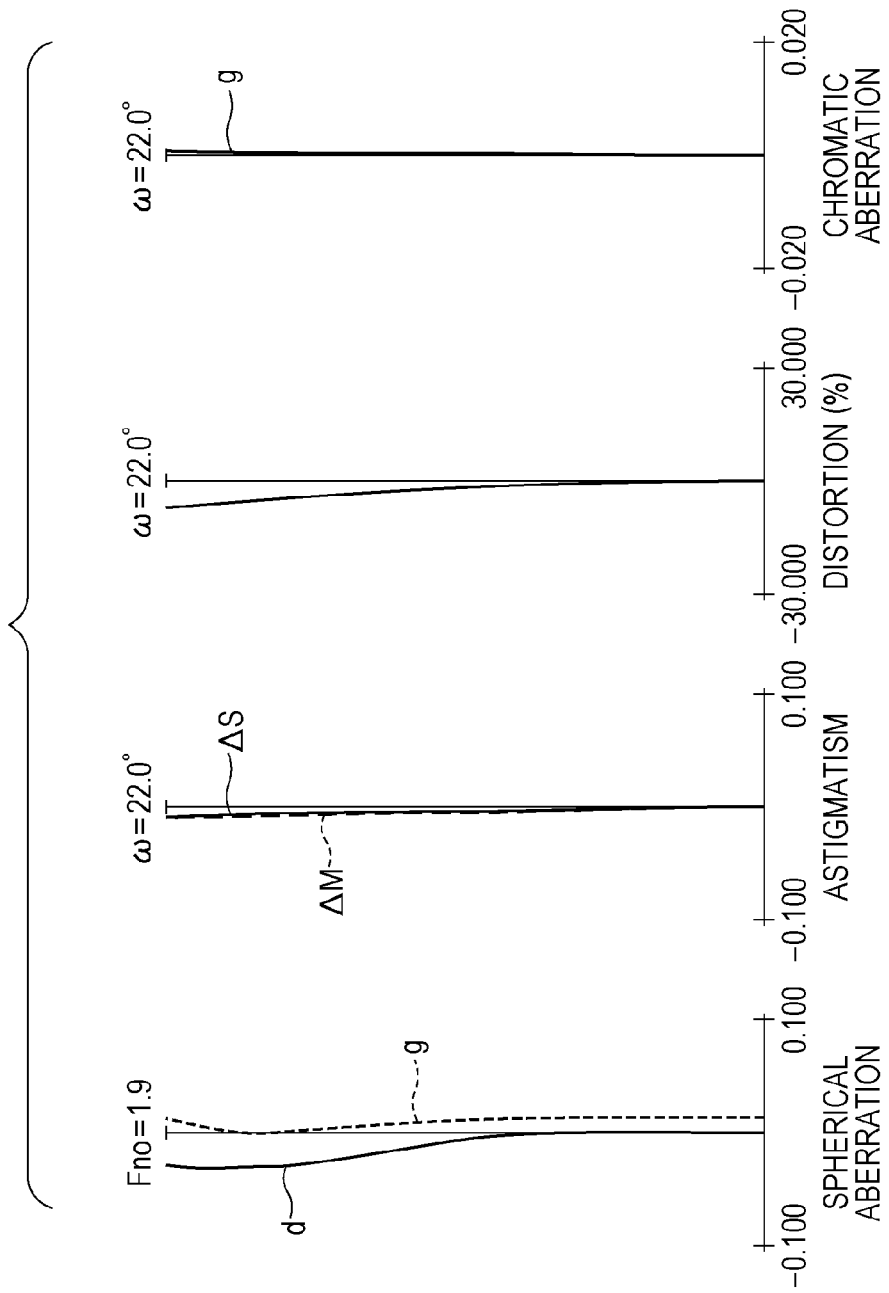

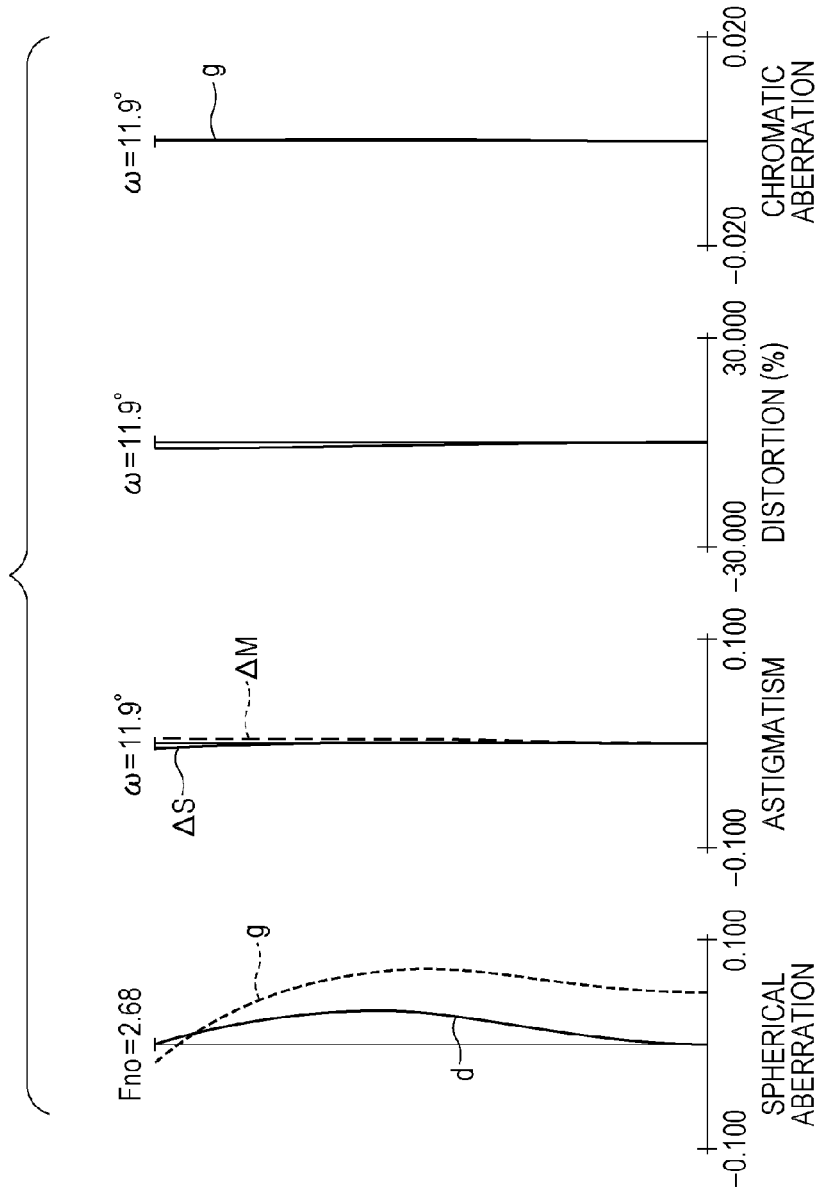

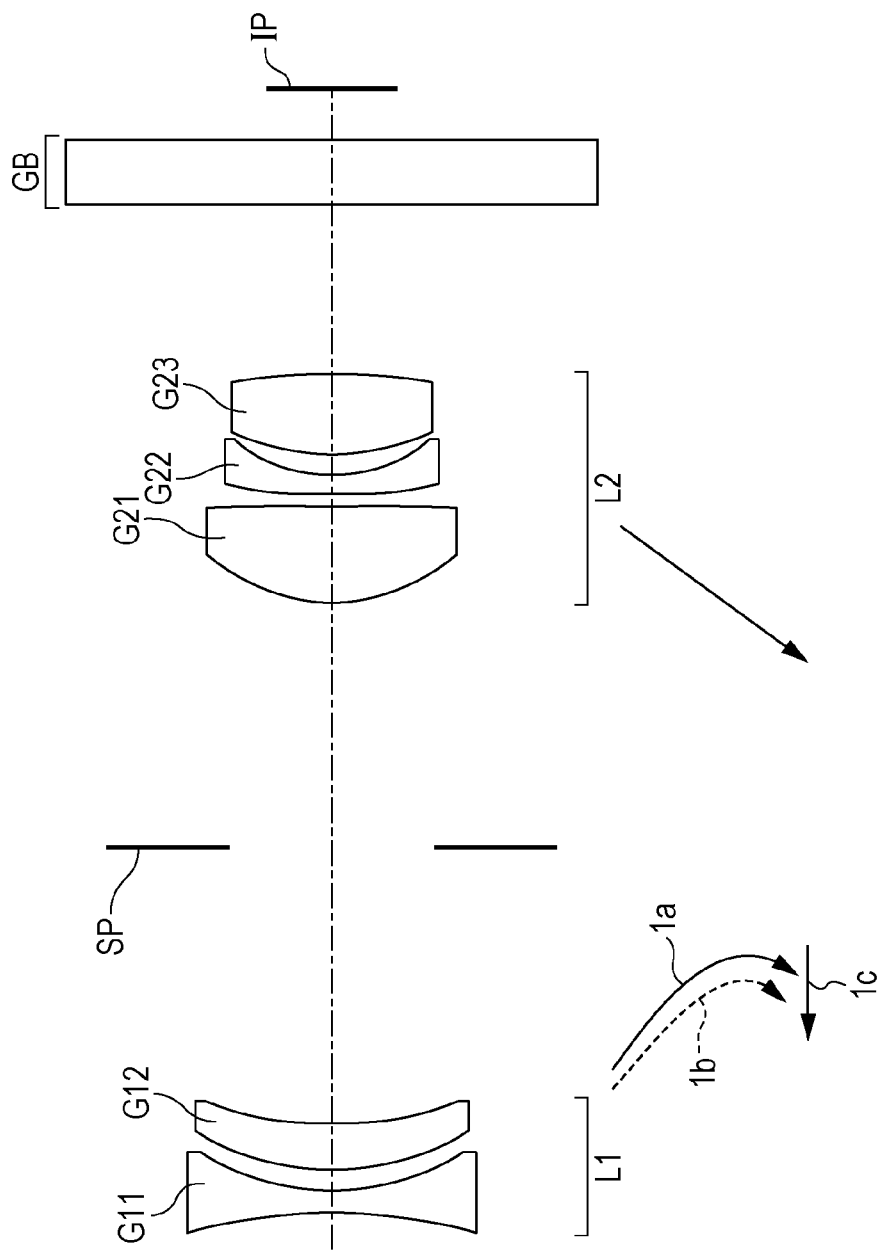

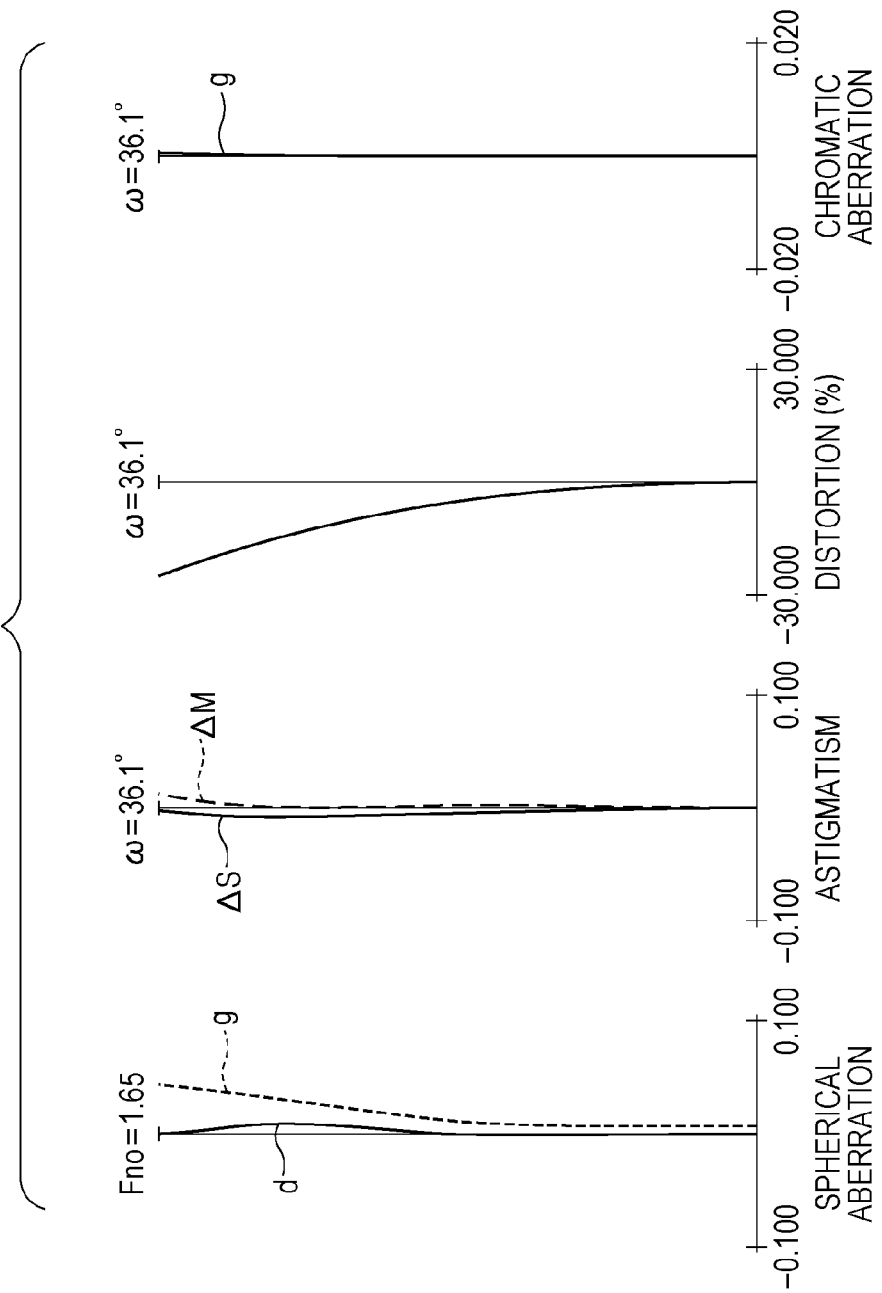

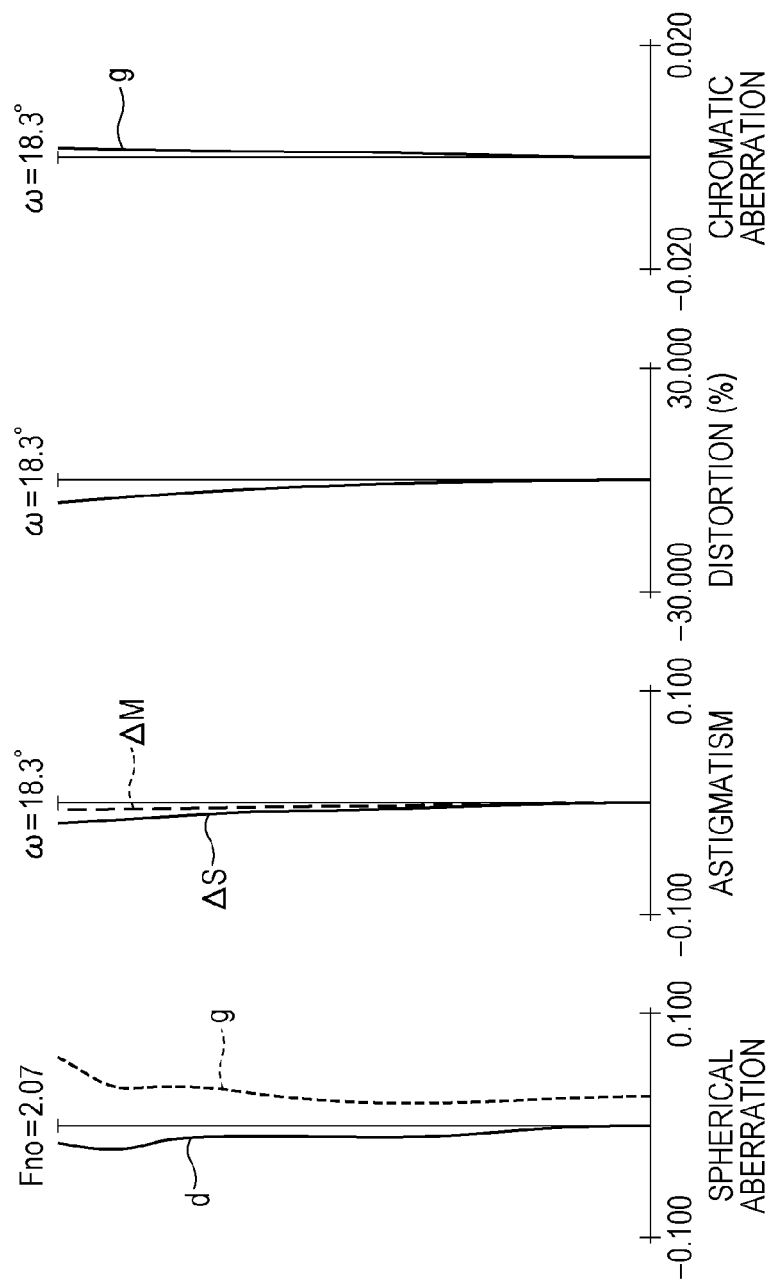

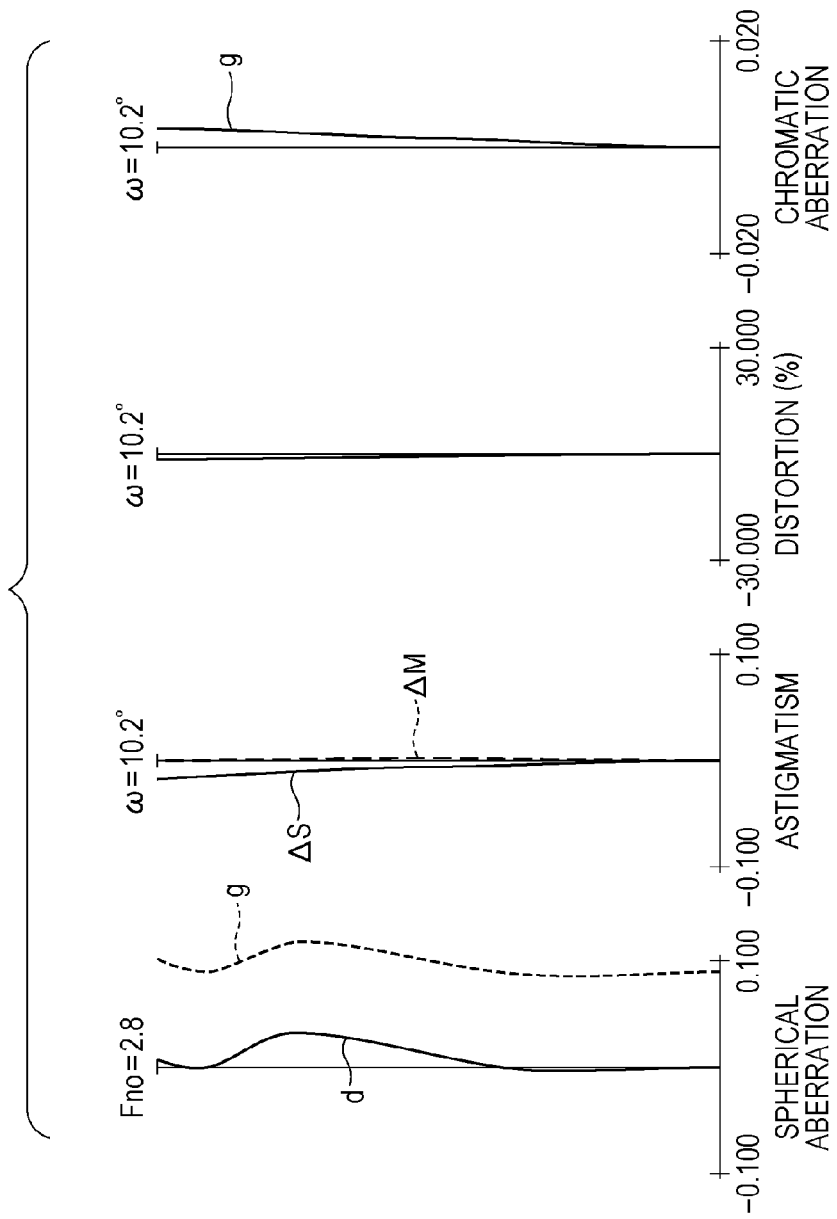

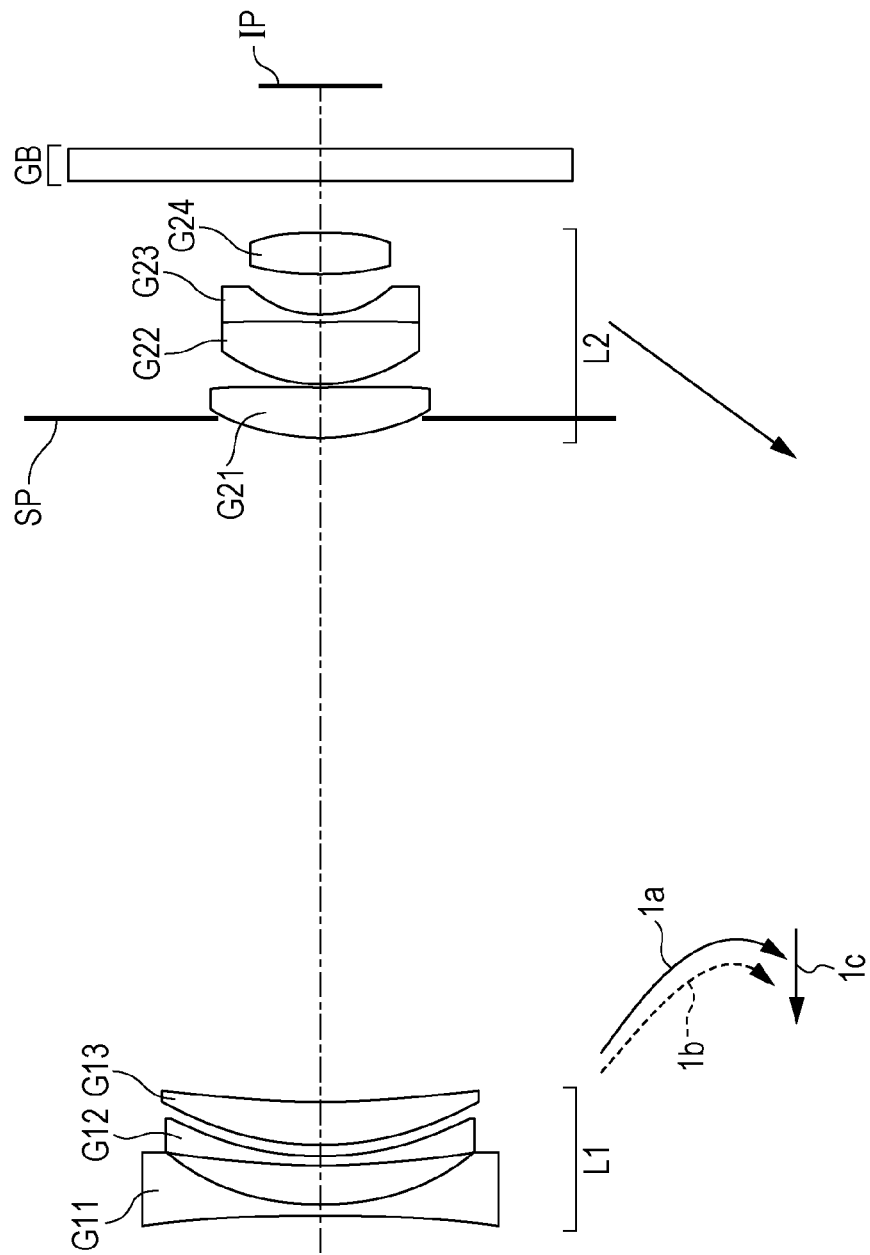

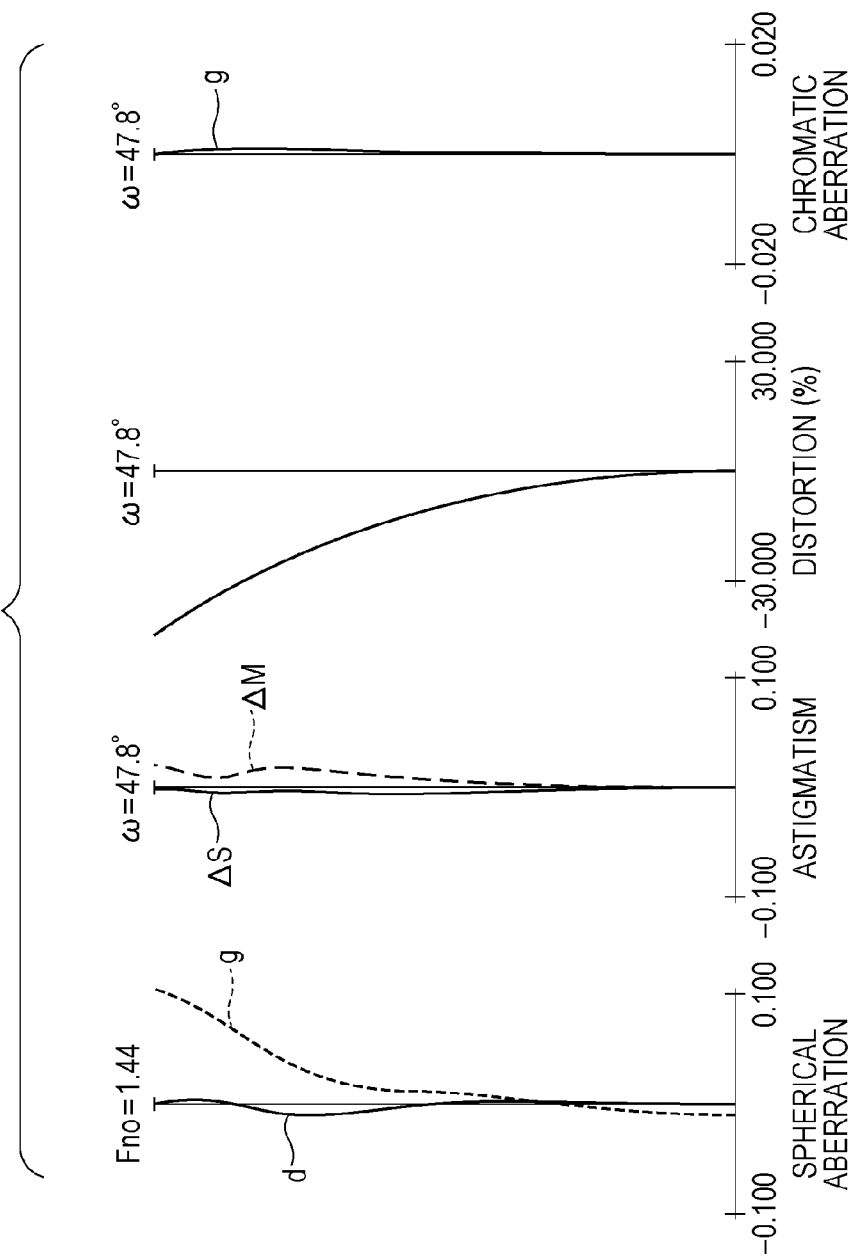

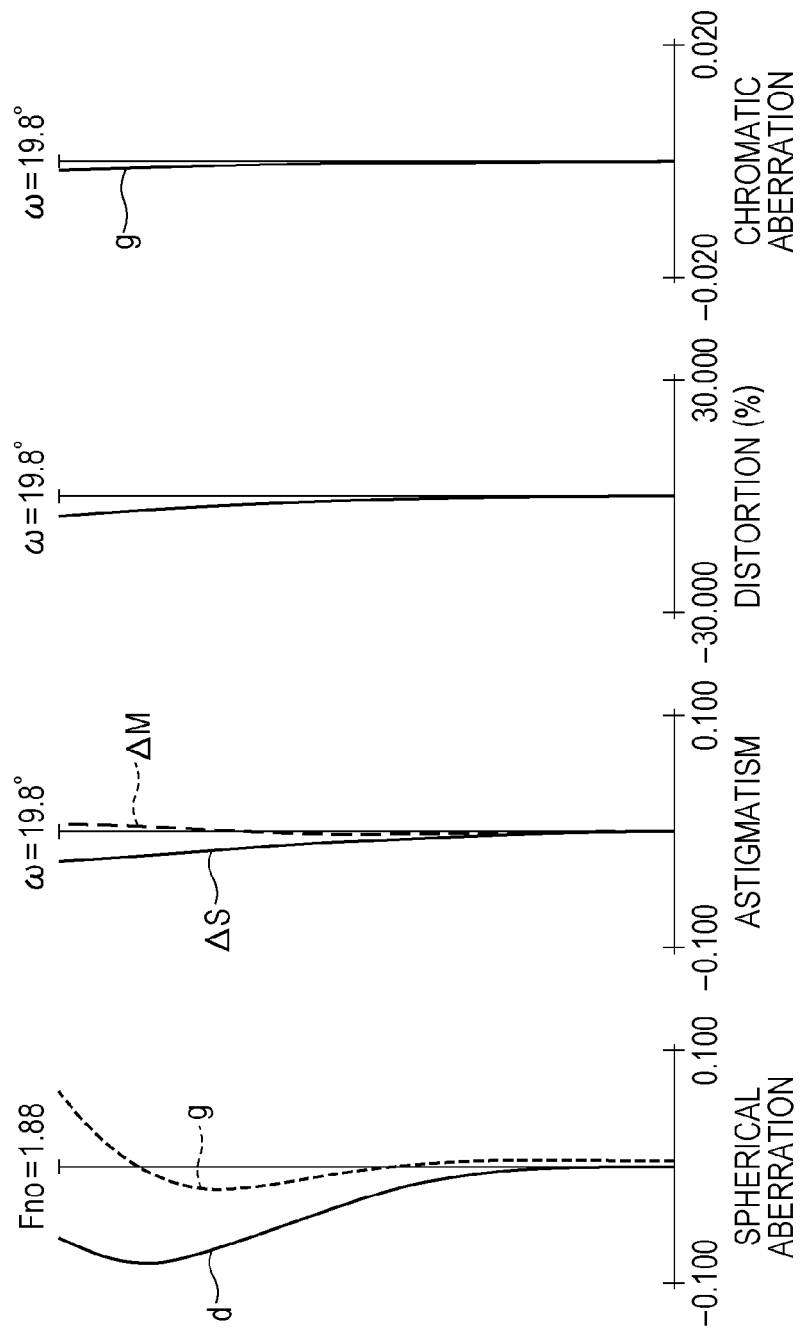

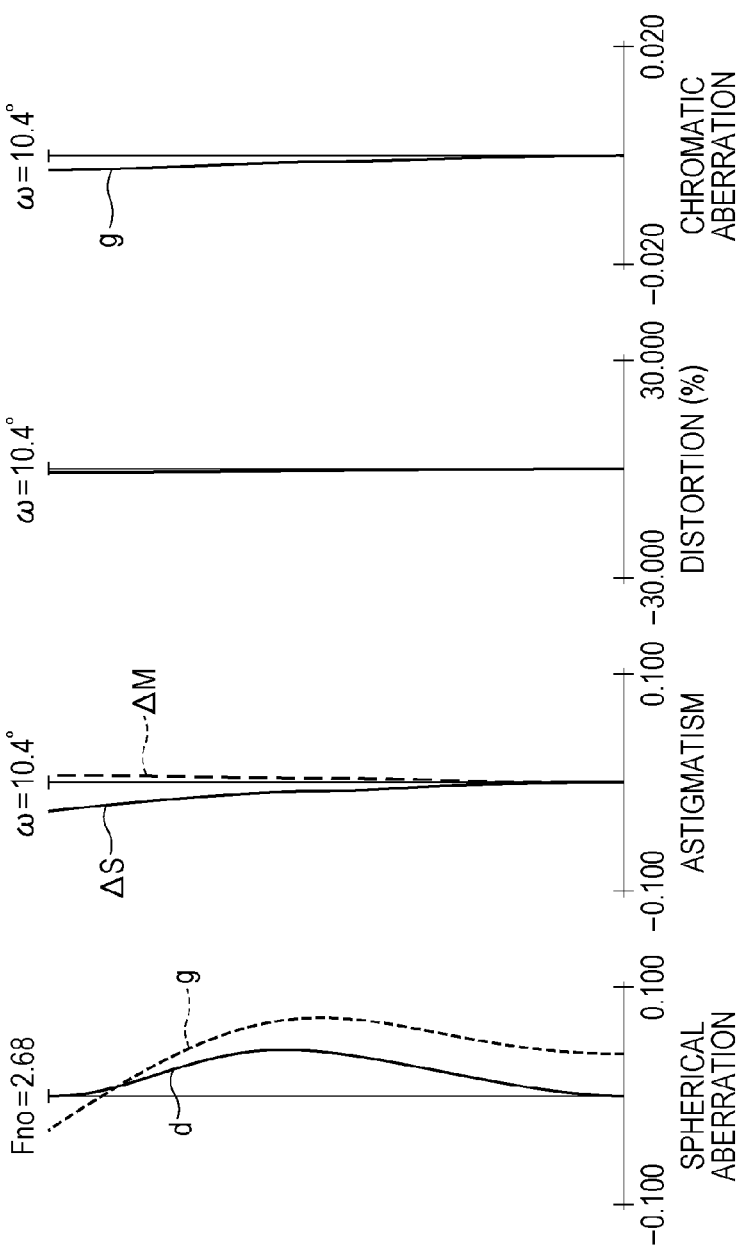

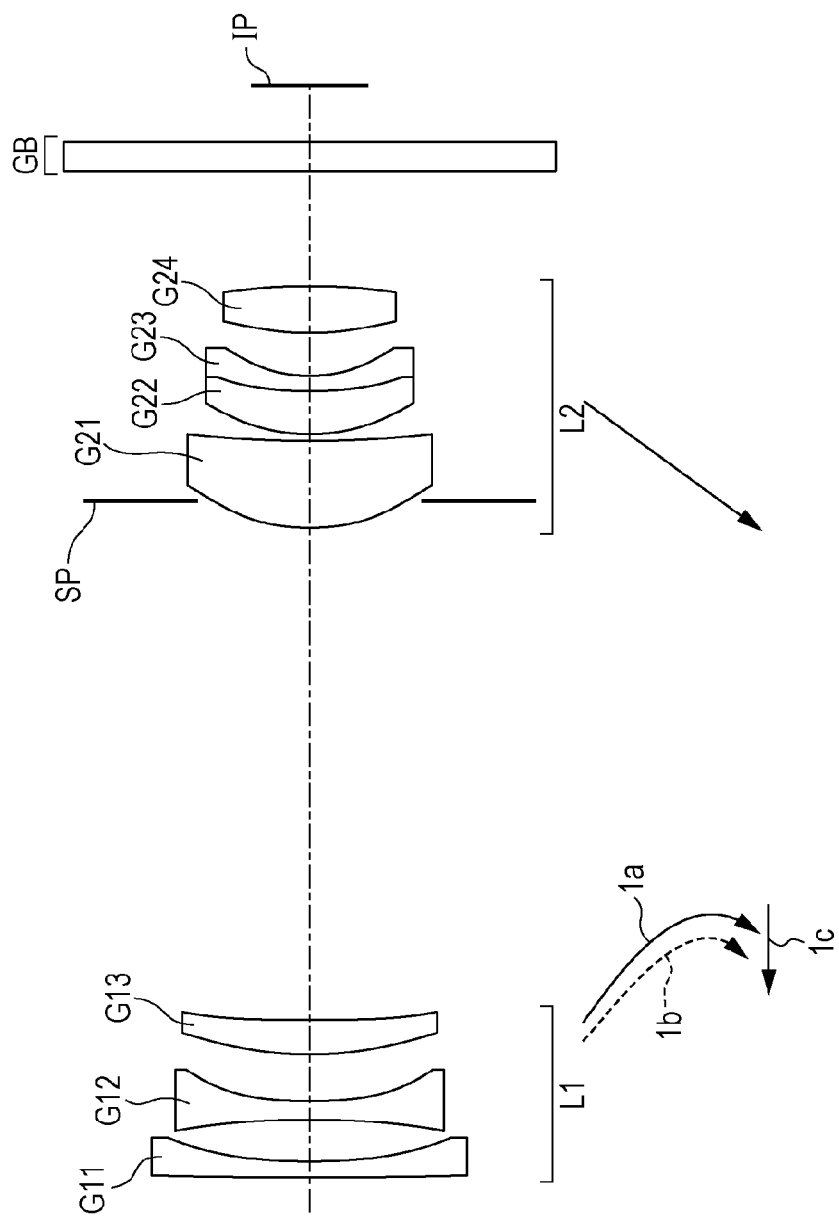

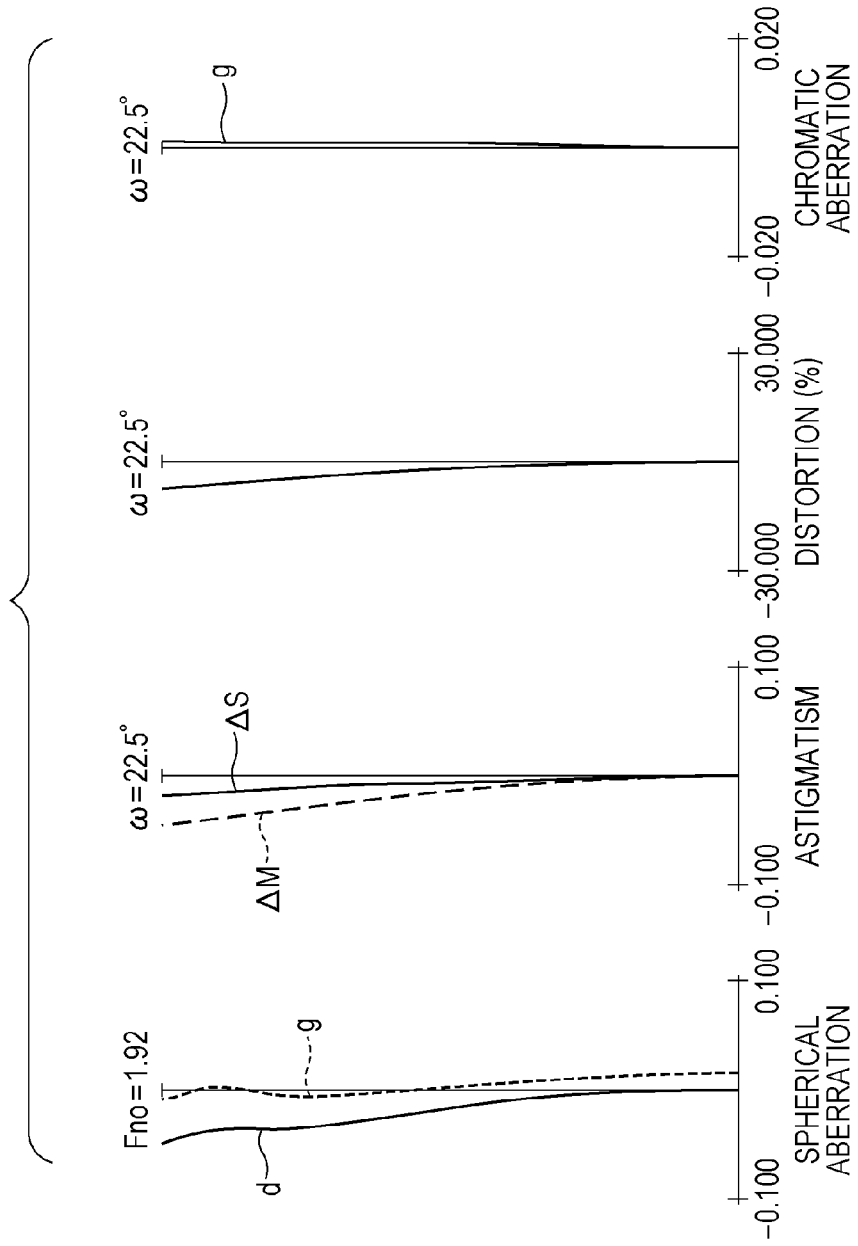

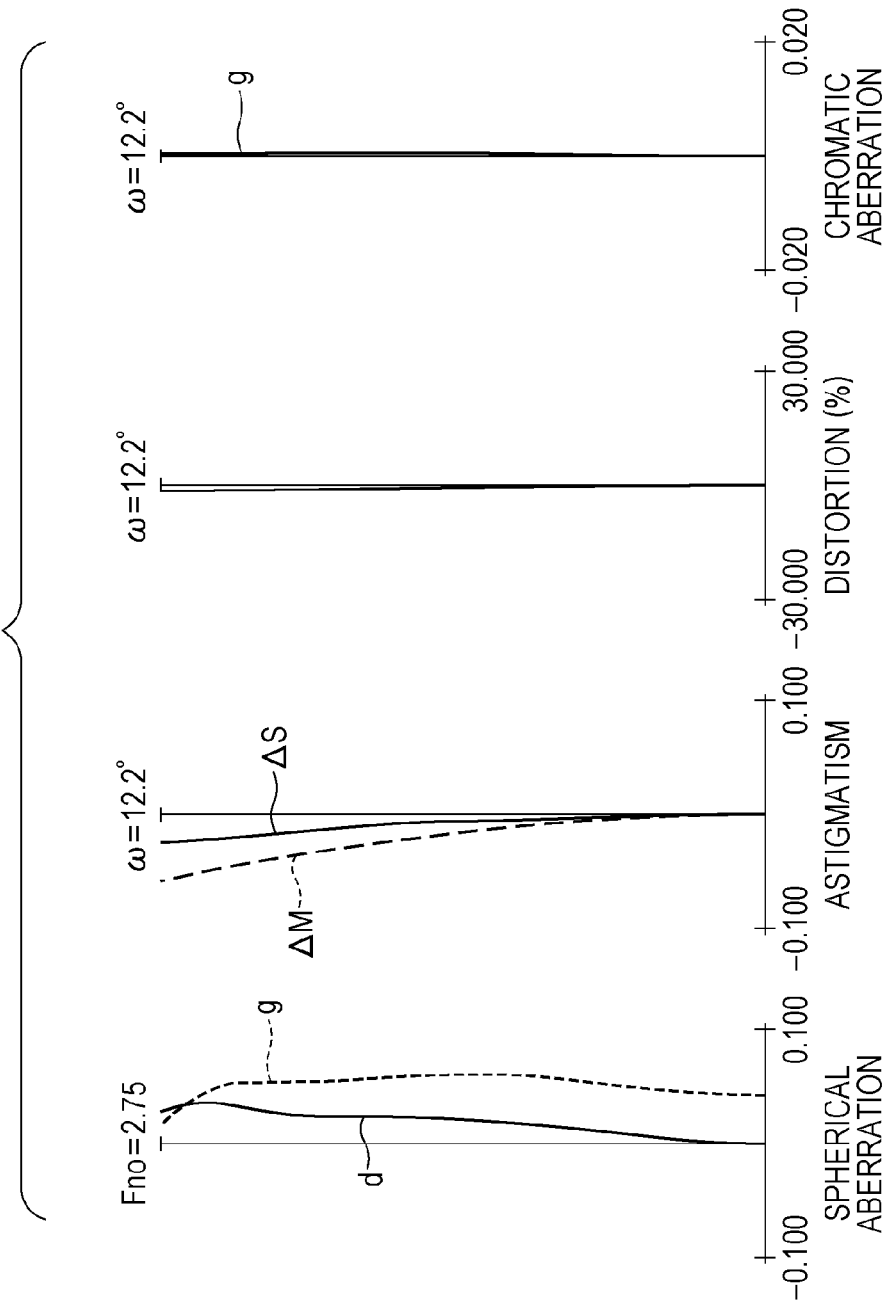

ZOOM LENS AND IMAGE PICKUP APPARATUS INCLUDING ZOOM LENS

BACKGROUND OF THE INVENTION

Field of the Invention

The present invention relates to a zoom lens and an image pickup apparatus including the zoom lens, and in particular, to a zoom lens that can be used as an image pickup optical system of an image pickup apparatus, such as a digital still camera, a video camera, a monitoring camera, a broadcast camera, or a film camera.

Description of the Related Art

It is required that a zoom lens used as image pickup optical system of an image pickup apparatus have a high optical performance. For example, for a zoom lens of a monitoring camera, it is required that the zoom lens have a super-wide view angle so that a wide area can be monitored with a single monitoring camera. Moreover, it is required that the zoom lens have a small F-number so that a clear image can be captured even at night. Furthermore, it is required that the entire zoom lens be small so that the monitoring camera can be easily set inconspicuously in monitoring locations.

Two-unit zoom lenses are known that include, from the object side to the image side, a first lens unit having a negative refractive power and a second lens unit having a positive refractive power. Two-unit zoom lenses perform zooming by moving the first and second lens units. Japanese Patent Application Laid-Open No. 8-320435 describes a small zoom lens having an angle of view of about 80 degrees at the wide angle end, an F-number of 2 at the wide angle end, and a zoom ratio in the range of about 3 to 6. Japanese Patent Application Laid-Open No. 2009-204699 describes a small zoom lens having an angle of view of about 140 degrees at the wide angle end, an F-number of 1.2 at the wide angle end, and a zoom ratio of about 3.5.

SUMMARY OF THE INVENTION

According to an aspect of the present invention, a zoom lens comprises, in order from object side to image side, a first lens unit having a negative refractive power and a second lens unit having a positive refractive power. During zooming, the first lens unit and the second lens unit move so that a distance between the first lens unit and the second lens unit changes. The first lens unit includes at least one positive lens and at least one negative lens. The zoom lens satisfies conditional expressions $$4.0 < TLw/BFw < 12.0,$$

$$0.20 < f2/ft < 0.90,$$

$$-1.30 < f1/f2 < -0.20, \text{ and}$$

$$1.86 < Nd < 3.00,$$

where TLw is a total length of the zoom lens at a wide angle end, BFw is a back focal length at the wide angle end, ft is a focal length of the zoom lens at a telephoto end, f1 is a focal length of the first lens unit, f2 is a focal length of the second lens unit, and Nd is a refractive index of a material of the at least one positive lens included in the first lens unit.

Further features of the present invention will become apparent from the following description of exemplary embodiments with reference to the attached drawings.

BRIEF DESCRIPTION OF THE DRAWINGS

FIG. 1 is a sectional view of a zoom lens at the wide angle end, according to a first exemplary embodiment.

FIGS. 2A, 2B, and 2C are aberration charts of the zoom lens at the wide angle end, at an intermediate zooming position, and at the telephoto end, respectively, according to the first exemplary embodiment.

FIG. 3 is a sectional view of a zoom lens at the wide angle end, according to a second exemplary embodiment.

FIGS. 4A, 4B, and 4C are aberration charts of the zoom lens at the wide angle end, at an intermediate zooming position, and at the telephoto end, respectively, according to the second exemplary embodiment.

FIG. 5 is a sectional view of a zoom lens at the wide angle end, according to a third exemplary embodiment.

FIGS. 6A, 6B, and 6C are aberration charts of the zoom lens at the wide angle end, at an intermediate zooming position, and at the telephoto end, respectively, according to the third exemplary embodiment.

FIG. 7 is a sectional view of a zoom lens at the wide angle end, according to a fourth exemplary embodiment.

FIGS. 8A, 8B, and 8C are aberration charts of the zoom lens at the wide angle end, at an intermediate zooming position, and at the telephoto end, respectively, according to the fourth exemplary embodiment.

DESCRIPTION OF THE EMBODIMENTS

Hereinafter, zoom lenses according to exemplary embodiments of the present invention and an image pickup apparatus including one of the zoom lenses will be described. Each of the zoom lenses according to the exemplary embodiments of the present invention includes, from the object side to the image side, a first lens unit having a negative refractive power and a second lens unit having a positive refractive power. During zooming, the first lens unit and the second lens unit move so that the distance between the first lens unit and the second lens unit changes.

FIG. 1 is a sectional view of a zoom lens according to a first exemplary embodiment of the present invention at the wide angle end (short focal length end). FIGS. 2A, 2B, and 2C are aberration charts of the zoom lens according to the first exemplary embodiment of the present invention at the wide angle end, at an intermediate zooming position, and at the telephoto end (long focal length end), respectively. The zoom lens according to the first exemplary embodiment has a zoom ratio of 3.42 and an aperture ratio in the range of 1.44 to 2.68.

FIG. 3 is a sectional view of a zoom lens according to a second exemplary embodiment of the present invention at the wide angle end. FIGS. 4A, 4B, and 4C are aberration charts of the zoom lens according to the second exemplary embodiment of the present invention at the wide angle end, at an intermediate zooming position, and at the telephoto end, respectively. The zoom lens according to the second exemplary embodiment has a zoom ratio of 3.07 and an aperture ratio in the range of 1.65 to 2.80.

FIG. 5 is a sectional view of a zoom lens according to a third exemplary embodiment of the present invention at the wide angle end. FIGS. 6A, 6B, and 6C are aberration charts of the zoom lens according to the third exemplary embodiment of the present invention at the wide angle end, at an intermediate zooming position, and at the telephoto end, respectively. The zoom lens according to the third exemplary embodiment has a zoom ratio of 3.90 and an aperture ratio in the range of 1.44 to 2.68.

Figure 8A:
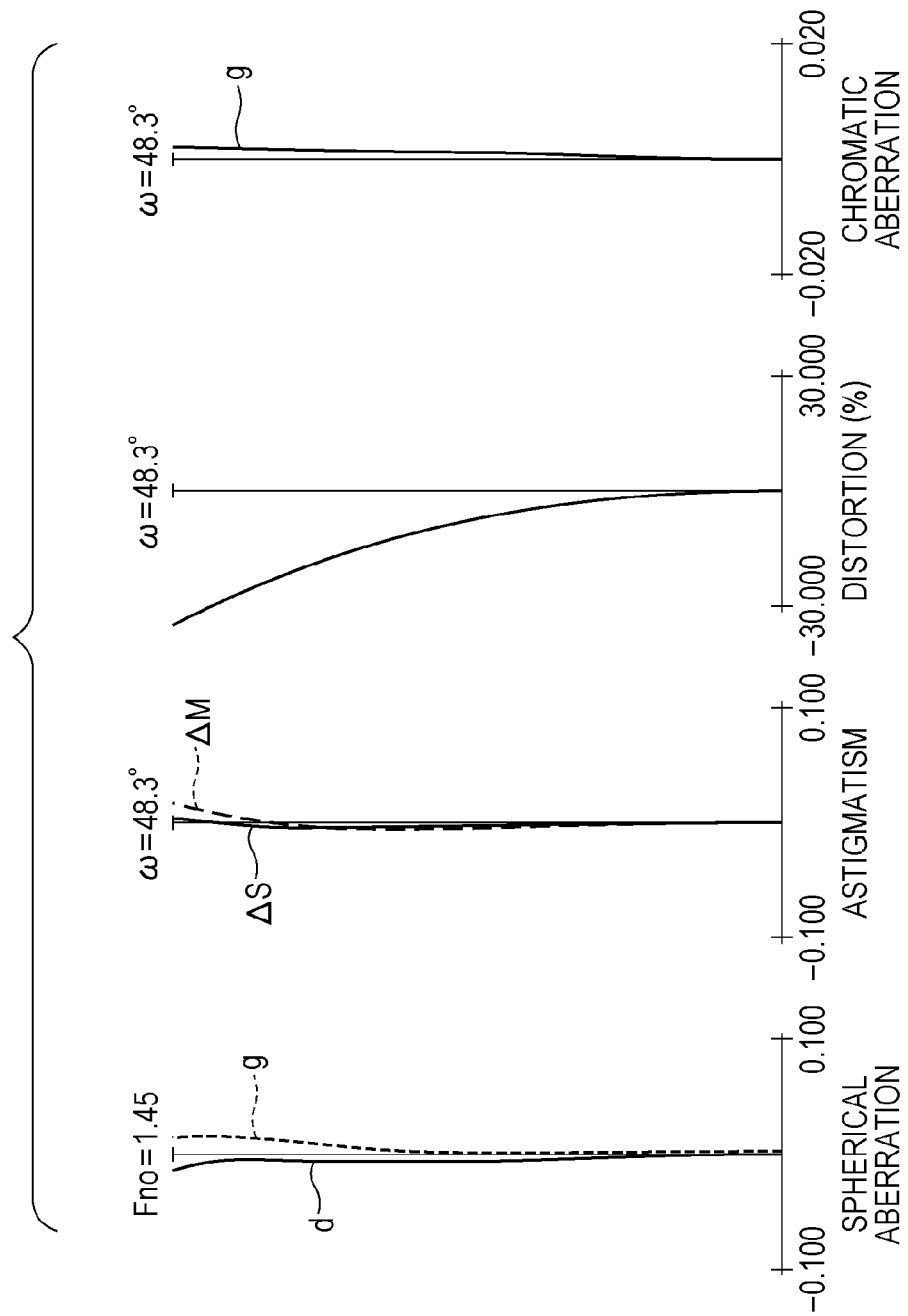
Figure 9:
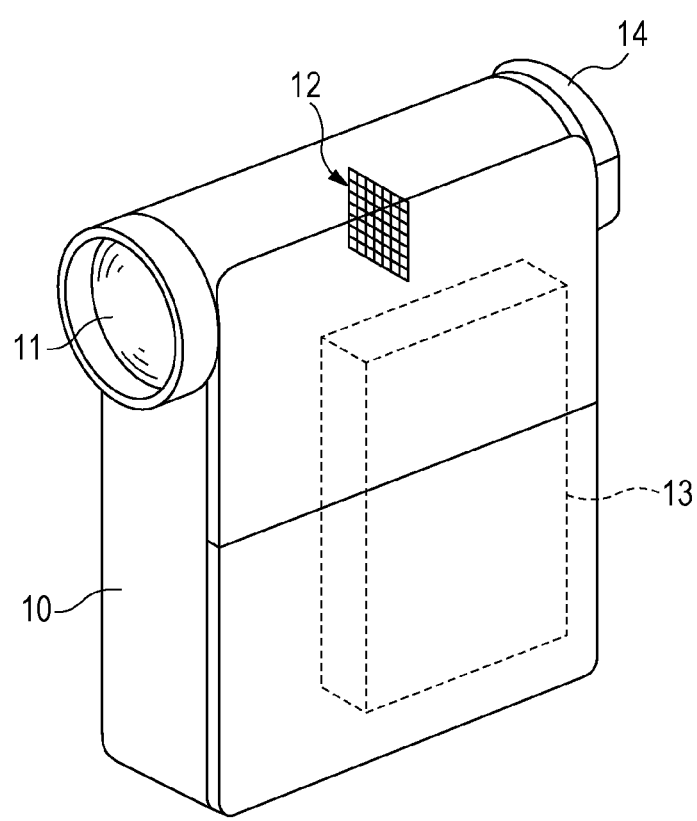
FIG. 9 illustrates a video camera, which is an example of an image pickup apparatus including a zoom lens according to one of the exemplary embodiments of the present invention.

FIG. 7 is a sectional view of a zoom lens according to a fourth exemplary embodiment of the present invention at the wide angle end. FIGS. 8A, 8B, and 8C are aberration charts of the zoom lens according to the fourth exemplary embodiment of the present invention at the wide angle end, at an intermediate zooming position, and at the telephoto end, respectively. The zoom lens according to the fourth exemplary embodiment has a zoom ratio of 3.43 and an aperture ratio in the range of 1.45 to 2.75. FIG. 9 is a partial schematic view of a video camera, which is an example of an image pickup apparatus including a zoom lens according to one of the exemplary embodiments of the present invention.

Each of the zoom lenses according to the exemplary embodiments is an image pickup optical system used for an image pickup apparatus. In the sectional views of zoom lenses, the left side is the object side (front side) and the right side is the image side (rear side). Each of the zoom lenses according to the exemplary embodiments may be used for an optical apparatus such as a projector. In this case, a screen is on the left side, and an image to be projected is on the right side.

The sectional view of each of the zoom lenses shows a first lens unit L1 having a negative refractive power (optical power, which is the reciprocal of the focal length) and a second lens unit L2 having a positive refractive power. An F-number determining member SP (hereinafter also referred to as "an aperture stop") functions as an aperture stop for determining (limiting) the diameter of a light beam for the full aperture F-number (Fno).

An optical block GB is an optical filter, a face plate, a quartz low-pass filter, an infrared cut-off filter, or the like. An image plane IP is a plane at which an image pickup surface of an image pickup device (photoelectric conversion element), such as a CCD sensor or a CMOS sensor, is positioned when the zoom lens is used as an image pickup optical system of a video camera or a digital still camera.

Arrows indicate loci along which the lens units move during zooming from the wide angle end to the telephoto end. An arrow 1a shows the locus along which the first lens unit L1 moves during zooming from the wide angle end to the telephoto end when the zoom lens is focusing on an object at infinity. An arrow 1b shows the locus along which the first lens unit L1 moves during zooming from the wide angle end to the telephoto end when the zoom lens is focused on an object at a short distance. An arrow 1c shows the direction in which the first lens unit L1 moves when focusing from infinity to a short distance.

In each of the spherical aberration charts, a solid line d represents the spherical aberration for the d-line (wavelength 587.6 nm) and a dotted line g represents the spherical aberration for the g-line (wavelength 435.8 nm). Fno denotes the F-number. In each of the astigmatism charts, a dotted line Δm represents the meridional image plane, and a solid line Δs represents the sagittal image plane. Each of transverse chromatic aberration charts shows the transverse chromatic aberration for the g-line. ω denotes the half angle of view (degrees).

Each of the zoom lenses according to the exemplary embodiments is a negative-lead two-unit zoom lens including, from the object side to the image side, the first lens unit L1 having a negative refractive power and the second lens unit L2 having a positive refractive power. During zooming, the first lens unit L1 and the second lens unit L2 move in the directions of the arrows so that the distance between the first lens unit L1 and the second lens unit L2 changes.

Magnification is changed by moving the second lens unit L2, and variation of the image plane that occurs due to change in magnification is corrected by moving the first lens unit L1.

In each of the exemplary embodiments, two movable lens units are provided so that the structure of the lens barrel can be simplified and the size of the entire zoom lens can be reduced. In the exemplary embodiments, the aperture stop SP is disposed on the image side of the first lens unit L1. During zooming, the aperture stop SP does not move or moves together with the second lens unit L2 (along the same locus as the second lens unit L2). More specifically, in each of the first, third, and fourth exemplary embodiments, the aperture stop SP is positioned between the vertex of the object-side lens surface of the lens G21, which is a lens of the second lens unit L2 nearest to the object, and the intersection of the object-side lens surface of the lens G21 and the outer periphery (edge portion) of the lens G21.

During zooming, the aperture stop SP moves together with the second lens unit L2. In the second exemplary embodiment, the aperture stop SP is disposed between the first lens unit L1 and the second lens unit L2 and does not move during zooming. The aperture diameter of the aperture stop SP may be constant or may be changed during zooming. By changing the aperture diameter of the aperture stop SP, coma flare at the lower-line, which is generated considerably at the telephoto end by an off-axis light beam, can be maximally cut. As a result, high optical performance can be easily maintained.

The zoom lens may perform focusing by moving the entirety of the first lens unit L1. Alternatively, the zoom lens may perform focusing by moving some lenses of the first lens unit L1, the second lens unit L2, or some lenses of the second lens unit L2 along the optical axis. In each of the exemplary embodiments, the first lens unit L1 includes at least one positive lens (lens having a positive refractive power) and at least one negative lens (lens having a negative refractive power).

In each of the exemplary embodiments, the following conditional expressions are satisfied:

$$4.0 < TLw/BFw < 12.0 \qquad (1)$$

$$0.20 < f2/ft < 0.90 \qquad (2)$$

$$-1.30 < f1/f2 < -0.20 \qquad (3)$$

$$1.86 < Nd < 3.00 \qquad (4),$$

where TLw is the total lens length at the wide angle end, BFw is the back focal length at the wide angle end, ft is the focal length of the entire zoom lens at the telephoto end, f1 is the focal length of the first lens unit L1, f2 is the focal length of the second lens unit L2, and Nd is the refractive index of the material of the at least one positive lens included in the first lens unit L1.

The total lens length is the sum of the distance from the first lens surface to the last lens surface (total optical length) and the back focal length (the air-equivalent distance from the last lens surface to the image plane).

Next, technical merits of the conditional expressions will be explained. The conditional expression (1) determines the optimal range of the ratio of the total lens length at the wide angle end to the back focal length at the wide angle end. If the back focal length becomes too small and the upper limit of the conditional expression (1) is not satisfied, it becomes difficult to provide sufficient space for disposing a filter, such as a low-pass filter, between the last lens surface and the image plane. If the back focal length becomes too large and the lower limit of the conditional expression (1) is not satisfied, it becomes difficult to provide sufficient space in which the second lens unit L2 can be moved for zooming, and the total lens length becomes larger.

The conditional expression (2) determines the range of the ratio of the focal length of the second lens unit L2 to the focal length of the entire zoom lens at the telephoto end. If the focal length of the second lens unit L2 becomes too large and the upper limit of the conditional expression (2) is not satisfied, in order to achieve a higher zoom ratio, it becomes necessary to increase the amount of movement of second lens unit L2 during zooming. As a result, the total lens length becomes too large. If the focal length of the second lens unit L2 becomes too small and the lower limit of the conditional expression (2) is not satisfied, spherical aberration, coma, and the like increase over the entire zoom range, and it becomes difficult to correct such aberrations.

The conditional expression (3) determines the range of the ratio of the focal length of the first lens unit L1 and the focal length of the second lens unit L2. If the absolute value of the focal length of the first lens unit L1 becomes too large and the lower limit of the conditional expression (3) is not satisfied, the amount of movement of the first lens unit L1 for correcting the image plane, which varies due to magnification, becomes larger, and the total lens length becomes larger. Also, if the focal length of the second lens unit L2 becomes too short and the lower limit of the conditional expression (3) is not satisfied, spherical aberration, coma, and the like increase over the entire zoom range. If the absolute value of the focal length of the first lens unit L1 becomes too small and the upper limit of the conditional expression (3) is not satisfied, field curvature occurs to a larger degree at the wide angle end.

Also, if the focal length of the second lens unit L2 becomes too large and the upper limit of the conditional expression (3) is not satisfied, the amount of movement of the second lens unit L2 for zooming becomes larger, and the total lens length becomes larger.

The conditional expression (4) determines the range of the refractive index of the material of a positive lens included in the first lens unit L1. If the refractive index of the material of the positive lens becomes too high and the upper limit of the conditional expression (4) is not satisfied, the Petzval sum becomes larger in the negative direction, and field curvature occurs on the over-side. If the refractive index of the material of the positive lens becomes too low and the lower limit of the conditional expression (4) is not satisfied, the total length of the first lens unit L1 becomes larger, and the total lens length becomes larger. In order to obtain a predetermined refractive power, it is necessary to increase the curvatures of lens surfaces. As a result, it becomes difficult to correct field curvature at the wide angle end.

In each of the exemplary embodiments, the lens structures of the lens units are appropriately set. Thus, a zoom lens having a small size, a wide view angle, a high zoom ratio, and a high optical performance over the entire zoom range is obtained. In each of the exemplary embodiments, it is preferable that the ranges of the conditional expressions (1) to (4) be as follows.

$$4.1 < TLw/BFw < 10.0 \tag{1a}$$

$$0.40 < f2/ft < 0.88 \tag{2a}$$

$$-1.28 < f1/f2 < -0.50 \tag{3a}$$

$$1.90 < Nd < 2.50 \tag{4a}$$

It is more preferable that the ranges of the conditional expressions (1a) to (4a) be as follows.

$$4.15 < TLw/BFw < 7.60 \tag{1b}$$

$$0.60 < f2/ft < 0.87 \tag{2b}$$

$$-1.26 < f1/f2 < -0.80 \tag{3b}$$

$$1.93 < Nd < 2.30 \tag{4b}$$

In each of the exemplary embodiments, it is more preferable that at least one of the following conditional expressions be satisfied:

$$10 < vd < 30 \tag{5}$$

$$0.020 < \theta gF - (0.644 - 0.00168 \cdot vd) < 0.080 \tag{6}$$

$$-4.00 < f1/fw < -2.10 \tag{7}$$

$$1.80 < Nd1a < 2.20 \tag{8}$$

$$1.65 < Nd2a < 1.90 \tag{9},$$

where vd and θgF are respectively the Abbe number and the partial dispersion ratio of the material of the at least one positive lens included in the first lens unit L1, fw is the focal length of the entire zoom lens at the wide angle end, Nd1a is the average refractive index of the materials of lenses included in the first lens unit L1, and Nd2a is the average refractive index of the materials of lenses included in the second lens unit L2.

The Abbe number vd and the partial dispersion ratio θgF are defined as follows. Let ng, nF, Nd, and nC respectively denote the refractive indices of a material at the wavelength of 436 nm (g-line), 486 nm (F-line), 588 nm (d-line), and 656 nm (C-line). Then, the Abbe number vd and the partial dispersion ratio θgF are defined by the following expressions.

$$vd = (Nd-1)/(nF-nC)$$

$$\theta gF = (ng-nF)/(nF-nC)$$

Next, technical meanings of the conditional expressions will be descried. The conditional expression (5) determines the range of the Abbe number of the material of the positive lens included in the first lens unit L1. If the Abbe number becomes too large and the upper limit of the conditional expression (5) is not satisfied, correction of transverse chromatic aberration at the wide angle end becomes insufficient. If the Abbe number becomes too small and the lower limit of the conditional expression (5) is not satisfied, correction of transverse chromatic aberration at the wide angle end becomes excessive.

The conditional expression (6) determines the range of an expression of the Abbe number and the partial dispersion of the material of the positive lens included in the first lens unit L1. If the partial dispersion ratio θgF becomes too large and the upper limit of the conditional expression (6) is not satisfied, correction of the second-order spectrum of transverse chromatic aberration at the wide angle end becomes excessive. If the partial dispersion ratio θgF becomes too small and the lower limit of the conditional expression (6) is not satisfied, correction of the second-order spectrum of transverse chromatic aberration at the wide angle end becomes insufficient.

The conditional expression (7) determines the range of the ratio of the focal length of the first lens unit L1 to the focal length of the entire zoom lens at the wide angle end. If the absolute value of the focal length f1 of the first lens unit L1 becomes too large and the lower limit of the conditional expression (7) is not satisfied, the amount of movement of first lens unit L1 during zooming becomes larger. Moreover, the distance between the first lens unit L1 and the second lens unit L2 becomes larger at the wide angle end, and the total lens length becomes larger. If the absolute value the focal length f1 of the first lens unit L1 becomes too small and the upper limit of the conditional expression (7) is not satisfied, it becomes difficult to correct field curvature at the wide angle end.

The conditional expression (8) determines the range of the average refractive index of the materials of the lenses included in the first lens unit L1. If the average refractive index of the materials of the lenses included in the first lens unit L1 becomes too high and the upper limit of the conditional expression (8) is not satisfied, the Petzval sum becomes too large in the positive direction, and it becomes difficult to correct field curvature and astigmatism. If the average refractive index becomes too low and the lower limit of the conditional expression (8) is not satisfied, in order to provide the first lens unit L1 with a predetermined refractive power, it is necessary to increase the curvatures of the lens surfaces. As a result, field curvature at the wide angle end becomes larger. Moreover, the length of the first lens unit L1 becomes larger and the total lens length becomes larger.

The conditional expression (9) determines the range of the average refractive index of the materials of the lenses of the second lens unit L2. If the average refractive index of the materials of the lenses of the second lens unit L2 becomes too high and the upper limit of the conditional expression (9) is not satisfied, the Petzval sum becomes negative and has an excessively large absolute value. As a result, it becomes difficult to correct field curvature and astigmatism. If the average refractive index becomes too low and the lower limit of the conditional expression (9) is not satisfied, in order to provide the second lens unit L2 with a predetermined refractive power, it becomes necessary to increase the curvatures of the lens surfaces. As a result, spherical aberration, coma, and the like increase, and it becomes difficult to correct such aberrations. Moreover, the length of the second lens unit L2 becomes larger and the total lens length becomes larger.

It is preferable that the ranges of the conditional expressions (5) to (9) be as follows.

$$12 < vd < 25 \quad (5a)$$

$$0.035 < \theta gF - (0.644 - 0.00168 \cdot vd) < 0.070 \quad (6a)$$

$$-3.50 < f1/fw < -2.15 \quad (7a)$$

$$1.83 < Nd1a < 2.10 \quad (8a)$$

$$1.67 < Nd2a < 1.88 \quad (9a)$$

It is more preferable that the ranges of the conditional expressions (5a) to (9a) be as follows.

$$14 < vd < 20 \quad (5b)$$

$$0.041 < \theta gF - (0.644 - 0.00168 \cdot vd) < 0.060 \quad (6b)$$

$$-3.45 < f1/fw < -2.20 \quad (7b)$$

$$1.85 < Nd1a < 2.00 \quad (8b)$$

$$1.68 < Nd2a < 1.85 \quad (9b)$$

In each of the exemplary embodiments, by configuring the elements as described above, a zoom lens having a small size, a wide view angle, a high zoom ratio, and a high optical performance over the entire zoom range is obtained. By using appropriate combinations of the above conditional expressions, the effects of the present invention can be enhanced further.

Next, the lens structures of the exemplary embodiments will be described. Unless otherwise noted, the lenses are arranged from the object side to the image side. The first, third, and fourth exemplary embodiments will be described. The first lens unit L1 includes a negative lens G11, a negative lens G12, and a positive lens G13. The object-side surface of the negative lens G11 has a convex meniscus shape, or both surfaces of the negative lens G11 have concave shapes. Both surfaces of the negative lens G12 have concave shapes, or the object-side surface of the negative lens G12 has a convex meniscus shape. The object-side surface of the positive lens G13 has a convex meniscus shape.

The second lens unit L2 includes a positive lens G21, a positive lens G22, a negative lens G23, and a positive lens G24. Both surfaces of the positive lens G21 have convex shapes, or the object-side surface of the positive lens G21 has a convex meniscus shape. Both surfaces of the positive lens G22 have convex shapes, or the object-side surface of the positive lens G22 has a convex meniscus shape. Both surfaces of the negative lens G23 have concave shapes, or the object-side surface of the negative lens G23 has a convex meniscus shape. Both surfaces of the positive lens G24 have convex shapes. The curvatures of the lens surfaces are decreased by providing the second lens unit L2 with three positive lenses and by dispersing the positive refractive power of the second lens unit L2. Thus, occurrence of spherical aberration is suppressed.

Moreover, aberrations, such as spherical aberration and coma, are appropriately corrected by making both surfaces of the positive lens G21 aspheric. Furthermore, longitudinal chromatic aberration is appropriately corrected over the entire zoom range by using a cemented lens, in which the positive lens G22 and the negative lens G23 are cemented to each other, and by making the difference between the Abbe numbers of the materials of the positive lens G22 and the negative lens G23 be large (25 or greater).

The second exemplary embodiment will be described. The first lens unit L1 includes a negative lens G11 and a positive lens G12. Both surfaces of the negative lens G11 have concave shapes. The object-side surface of the positive lens G12 has a convex meniscus shape. The curvatures of the lens surfaces are decreased by using materials having high refractive indices (of 1.8 or higher) for the negative lens G11 and the positive lens G12, and thereby field curvature is appropriately corrected at the wide angle end. Transverse chromatic aberration is appropriately corrected at the wide angle end by making the difference between the Abbe numbers of the materials of the negative lens G11 and the positive lens G12 be large (25 or greater).

The second lens unit L2 includes a positive lens G21, a negative lens G22, and a positive lens G23. Both surfaces of the positive lens G21 have convex shapes. The object-side surface of the negative lens G22 has a convex meniscus shape. Both surfaces of the positive lens G23 have convex shapes. Aberrations, such as spherical aberration and coma, are appropriately corrected by making both surfaces of the positive lens G21 be aspheric.

Next, referring to FIG. 9, a video camera (an image pickup apparatus) using a zoom lens according to one of the exemplary embodiments of the present invention as an image pickup optical system will be described. FIG. 9 shows a video camera body 10 and an image pickup optical system 11, which is a zoom lens according to one of the first to fourth exemplary embodiments. A solid-state image pickup device 12 (photoelectric conversion element, which is a CCD sensor, a CMOS sensor, or the like) is disposed in the camera body 10. The solid-state image pickup device 12 captures an image of an object formed by the image pickup optical system 11. A memory 13 stores information corresponding to object images that have been photoelectrically converted by the solid-state image pickup device 12. A finder 14 is used to monitor an object image displayed on a display device (not shown).

The display device, which includes a liquid crystal panel or the like, displays an object image formed on the image pickup device 12.

The image pickup apparatus according to an exemplary embodiment of the present invention may include, in addition to the zoom lens according to one of the first to fourth exemplary embodiments, a correction circuit (correction unit) that corrects at least one of aberrations, such as distortion or transverse chromatic aberration, by performing image processing. By configuring the image pickup apparatus so that it can correct distortion and the like of the zoom lens, the number of lenses of the entire zoom lens can be reduced and the size of the image pickup device can be easily reduced. By correcting transverse chromatic aberration by performing image processing, chromatic blur of a captured image can be reduced and resolution can be improved more easily.

The present invention is not limited to the exemplary embodiments described above and can be modified in various ways within the spirit and scope thereof.

Next, first to fourth numerical examples, which respectively correspond to the first to fourth exemplary embodiments according to the present invention, will be described. In the numeric examples, i denotes the order of an optical surface from the object side. ri denotes the radius of curvature of the i-th optical surface (i-th surface), di denotes the distance between the i-th surface and the (i+1)-th surface, and ndi and vdi respectively denote the refractive index and the Abbe number of the material of the i-th optical member with respect to the d-line. The values of d7 are negative in the first, third, and fourth numerical examples, because the aperture stop SP and a lens surface of the second lens unit L2 nearest to the object are counted in the order from the object side to the image side.

An aspherical surface of a lens element is denoted by an asterisk "*" next to that surface number. The aspherical shape of a lens surface is represented by the following equation:

$$x=(h^2/R)/[1+\{1-(1+k)(h/R)^2\}^{1/2}]+A4h^4+A6h^6+A8h^8+A10h^{10},$$

where k is the eccentricity; A4, A6, A8, and A10 are aspherical coefficients, h is the height from the optical axis with respect to the surface vertex, x is displacement along the optical axis at the height h, and R is the paraxial radius of curvature. Table 1 shows the correspondence between the numerical examples and the conditional expressions described above.

FIRST NUMERICAL EXAMPLE

| unit mm | | | | |
|---|---|---|---|---|
| surface data | | | | |
| surface number | r | d | nd | vd |
| 1 | 101.633 | 0.40 | 1.83481 | 42.7 |
| 2 | 13.074 | 0.94 | | |
| 3 | −17.693 | 0.40 | 1.80400 | 46.6 |
| 4 | 5.773 | 1.12 | | |
| 5 | 8.244 | 0.89 | 1.95906 | 17.5 |
| 6 | 16.752 | (variable) | | |
| 7(stop) | ∞ | −0.50 | | |
| 8* | 6.326 | 2.14 | 1.69350 | 53.2 |
| 9* | −23.836 | 0.18 | | |
| 10 | 7.338 | 1.72 | 1.77250 | 49.6 |
| 11 | −50.974 | 0.45 | 1.84666 | 23.9 |
| 12 | 3.999 | 1.06 | | |
| 13 | 8.681 | 2.18 | 1.69680 | 55.5 |
| 14 | −10.775 | (variable) | | |
| 15 | ∞ | 0.80 | 1.51000 | 60.0 |
| 16 | ∞ | 1.10 | | |
| image plane | ∞ | | | |

| aspherical surface data |
|---|
| 8th surface |
| K = −4.78616e−001   A4 = −3.92885e−004   A6 = −2.50594e−005 |
| A8 = 1.85523e−006   A10 = −1.48911e−007 |
| 9th surface |
| K = 0.00000e+000   A4 = 4.02576e−004   A6 = −5.57126e−005 |
| A8 = 4.92040e−006   A10 = −2.94804e−007 |

| various data zoom ratio 3.42 | | | |
|---|---|---|---|
| | wide angle | intermediate | telephoto |
| focal length | 2.22 | 4.21 | 7.60 |
| F-number | 1.44 | 1.90 | 2.68 |
| half angle of view (degrees) | 47.50 | 22.00 | 11.90 |
| image height | 1.58 | 1.58 | 1.58 |
| total lens length | 28.52 | 23.00 | 22.92 |
| BF | 4.27 | 6.49 | 10.27 |
| d 6 | 13.27 | 5.53 | 1.67 |
| d14 | 2.65 | 4.87 | 8.65 |

| zoom lens unit data | | |
|---|---|---|
| unit | starting surface | focal length |
| 1 | 1 | −5.71 |
| 2 | 7 | 6.37 |

SECOND NUMERICAL EXAMPLE

| unit mm | | | | |
|---|---|---|---|---|
| surface data | | | | |
| surface number | r | d | nd | vd |
| 1 | −11.979 | 0.50 | 1.83481 | 42.7 |
| 2 | 5.971 | 0.52 | | |
| 3 | 6.392 | 1.11 | 2.10205 | 16.8 |
| 4 | 9.351 | (variable) | | |

-continued unit mm

| | | | | |
|---|---|---|---|---|
| 5(stop) | ∞ | (variable) | | |
| 6* | 4.279 | 2.38 | 1.58313 | 59.4 |
| 7* | −48.850 | 0.25 | | |
| 8 | 13.046 | 0.50 | 1.84666 | 23.9 |
| 9 | 4.000 | 0.48 | | |
| 10 | 5.967 | 1.96 | 1.71300 | 53.9 |
| 11 | −15.011 | (variable) | | |
| 12 | ∞ | 1.60 | 1.51000 | 60.0 |
| 13 | ∞ | 1.22 | | |
| image plane | ∞ | | | | aspherical surface data

6th surface

K = −2.14873e−001  A4 = −9.10884e−004  A6 = 3.26896e−005
A8 = −6.86925e−006  A10 = 1.41488e−007

7th surface

K = 0.00000e+000  A4 = 5.26521e−004  A6 = 1.07717e−004
A8 = −2.31364e−005  A10 = 1.15326e−006 various data
zoom ratio 3.07

| | wide angle | intermediate | telephoto |
|---|---|---|---|
| focal length | 2.89 | 5.10 | 8.86 |
| F-number | 1.65 | 2.07 | 2.80 |
| half angle of view (degrees) | 36.10 | 18.30 | 10.20 |
| image height | 1.58 | 1.58 | 1.58 |
| total lens length | 26.74 | 22.46 | 22.60 |
| BF | 6.39 | 8.58 | 12.31 |
| d 4 | 6.73 | 2.45 | 2.59 |
| d 5 | 5.92 | 3.73 | 0.00 |
| d11 | 4.11 | 6.30 | 10.03 | zoom lens unit data

| unit | starting surface | focal length |
|---|---|---|
| 1 | 1 | −6.60 |
| 2 | 6 | 6.54 |

THIRD NUMERICAL EXAMPLE unit mm surface data

| surface number | r | d | nd | vd |
|---|---|---|---|---|
| 1 | −71.409 | 0.55 | 2.00069 | 25.5 |
| 2 | 12.495 | 1.82 | | |
| 3 | 48.333 | 0.50 | 1.77250 | 49.6 |
| 4 | 16.258 | 0.57 | | |
| 5 | 15.539 | 2.15 | 2.10205 | 16.8 |
| 6 | 54.002 | (variable) | | |
| 7(stop) | ∞ | −1.00 | | |
| 8* | 10.946 | 2.89 | 1.58313 | 59.4 |
| 9* | −109.671 | 0.18 | | |
| 10 | 7.962 | 3.16 | 1.88300 | 40.8 |
| 11 | 93.887 | 0.40 | 1.84666 | 23.9 |
| 12 | 5.155 | 2.32 | | |
| 13 | 12.463 | 2.33 | 1.48749 | 70.2 |
| 14 | −18.929 | (variable) | | |

-continued unit mm

| | | | | |
|---|---|---|---|---|
| 15 | ∞ | 1.52 | 1.51000 | 60.0 |
| 16 | ∞ | 2.08 | | |
| image plane | ∞ | | | | aspherical surface data

8th surface

K = −4.32230e−001  A4 = −3.92252e−005  A6 = −3.89394e−007
A8 = −1.35638e−008  A10 = −9.13159e−010

9th surface

K = 0.00000e+000  A4 = 7.10021e−005  A6 = −1.486306−006
A8 = 1.01029e−008  A10 = −1.224836−009 various data
zoom ratio 3.90

| | wide angle | intermediate | telephoto |
|---|---|---|---|
| focal length | 4.22 | 8.75 | 16.46 |
| F-number | 1.44 | 1.89 | 2.68 |
| half angle of view (degrees) | 47.80 | 19.80 | 10.40 |
| image height | 3.00 | 3.00 | 3.00 |
| total lens length | 55.32 | 38.25 | 35.43 |
| BF | 7.33 | 10.99 | 17.21 |
| d 6 | 32.12 | 11.40 | 2.35 |
| d14 | 4.24 | 7.90 | 14.12 | zoom lens unit data

| unit | starting surface | focal length |
|---|---|---|
| 1 | 1 | −14.47 |
| 2 | 7 | 11.67 |

FOURTH NUMERICAL EXAMPLE unit mm surface data

| surface number | r | d | nd | vd |
|---|---|---|---|---|
| 1 | 1356.085 | 0.40 | 1.88300 | 40.8 |
| 2 | 11.444 | 1.11 | | |
| 3 | −20.156 | 0.40 | 1.83481 | 42.7 |
| 4 | 6.335 | 1.29 | | |
| 5 | 10.194 | 0.95 | 2.10205 | 16.8 |
| 6 | 23.887 | (variable) | | |
| 7(stop) | ∞ | −0.70 | | |
| 8* | 5.282 | 2.30 | 1.69350 | 53.2 |
| 9* | 503.803 | 0.15 | | |
| 10 | 4.971 | 1.16 | 1.48749 | 70.2 |
| 11 | 9.228 | 0.40 | 1.92286 | 18.9 |
| 12 | 3.792 | 1.12 | | |
| 13 | 9.038 | 1.24 | 1.69680 | 55.5 |
| 14 | −11.606 | (variable) | | |
| 15 | ∞ | 0.80 | 1.51000 | 60.0 |
| 16 | ∞ | 1.45 | | |
| image plane | ∞ | | | |

-continued unit mm aspherical surface data

8th surface

K = −7.29555e−003   A4 = −8.44011e−005   A6 = −2.69894e−005
A8 = 5.18401e−006   A10 = −1.56963e−007   A12 = 6.04399e−009

9th surface

K = 0.00000e+000   A4 = 1.47070e−003   A6 = −4.22941e−005
A8 = 1.10377e−005   A10 = −2.49627e−007 various data
zoom ratio 3.43

|  | wide angle | intermediate | telephoto |
| --- | --- | --- | --- |
| focal length | 2.16 | 4.11 | 7.43 |
| F-number | 1.45 | 1.92 | 2.75 |
| half angle of view (degrees) | 48.30 | 22.50 | 12.20 |
| image height | 1.58 | 1.58 | 1.58 |
| total lens length | 28.42 | 22.86 | 22.82 |
| BF | 4.98 | 7.22 | 11.05 |
| d 6 | 13.64 | 5.83 | 1.96 |
| d14 | 3.00 | 5.25 | 9.08 | zoom lens unit data

| unit | starting surface | focal length |
| --- | --- | --- |
| 1 | 1 | −5.56 |
| 2 | 7 | 6.42 |

TABLE 1

|  | First Numerical Example | Second Numerical Example | Third Numerical Example | Fourth Numerical Example |
| --- | --- | --- | --- | --- |
| Conditional Expression (1) | 6.68 | 4.18 | 7.55 | 40.8 |
| Conditional Expression (2) | 0.84 | 0.74 | 0.71 | 0.86 |
| Conditional Expression (3) | −0.90 | −1.01 | −1.24 | −0.87 |
| Conditional Expression (4) | 1.96 | 2.10 | 2.10 | 2.10 |
| Conditional Expression (5) | 17.5 | 16.8 | 16.8 | 16.8 |
| Conditional Expression (6) | 0.045 | 0.045 | 0.045 | 0.056 |
| Conditional Expression (7) | −2.57 | −2.28 | −3.43 | −2.57 |
| Conditional Expression (8) | 1.87 | 1.97 | 1.96 | 1.94 |
| Conditional Expression (9) | 1.75 | 1.71 | 1.70 | 1.70 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-108835, filed May 23, 2013, which is hereby incorporated by reference herein in its entirety.

What is claimed is:

1. A zoom lens comprising, in order from an object side to an image side:
a first lens unit having a negative refractive power; and
a second lens unit having a positive refractive power,
wherein, during zooming, the first lens unit and the second lens unit move so that a distance between the first lens unit and the second lens unit changes,
wherein the first lens unit includes a negative lens, a negative lens and a positive lens that are disposed in this order from the object side to the image side, and the second lens unit includes a positive lens, a positive lens, a negative lens and a positive lens that are disposed in this order from the object side to the image side,
wherein the zoom lens performs focusing by moving the first lens unit,
wherein the zoom lens further comprises an aperture stop disposed between the first lens unit and the second lens unit, and
wherein the zoom lens satisfies conditional expressions $4.18 \leq TLw/BFw < 12.0,$ $0.20 < f2/ft < 0.90,$ $-1.30 < f1/f2 < -0.20,$ where TLw is a total length of the zoom lens at a wide angle end, BFw is a back focal length at the wide angle end, ft is a focal length of the zoom lens at a telephoto end, f1 is a focal length of the first lens unit, f2 is a focal length of the second lens unit, and
wherein at least one positive lens included in the first lens unit satisfies conditional expression:

$1.86 < Nd < 3.00,$ where Nd is a refractive index of a material of a positive lens included in the first lens unit.

2. The zoom lens according to claim 1,
wherein at least one positive lens included in the first lens unit satisfies conditional expressions $10 < vd < 30$ and $0.020 < \theta gF - (0.644 - 0.00168 \cdot vd) < 0.080,$ where vd and θgF are respectively an Abbe number and a partial dispersion ratio of the material of a positive lens included in the first lens unit.

3. The zoom lens according to claim 2,
wherein at least one positive lens included in the first lens unit satisfies conditional expressions $10 < vd < 17.5$ and $0.035 < \theta gF - (0.644 - 0.00168 \cdot vd) < 0.080.$ 4. The zoom lens according to claim 1,
wherein the zoom lens satisfies a conditional expression $-4.00 < f1/fw < -2.10,$ where fw is a focal length of the entire zoom lens at the wide angle end.

5. The zoom lens according to claim 1,
wherein the zoom lens satisfies a conditional expression $1.80 < Nd1a < 2.20,$ where Nd1a is an average refractive index of materials of lenses included in the first lens unit.

6. The zoom lens according to claim 1,
wherein the zoom lens satisfies a conditional expression $1.65 < Nd2a < 1.90$, where $Nd2a$ is an average refractive index of materials of lenses included in the second lens unit.

7. An image pickup apparatus comprising:
a zoom lens; and
an image pickup device that captures an image formed by the zoom lens,
wherein the zoom lens comprising, in order from an object side to an image side:
   a first lens unit having a negative refractive power, and
   a second lens unit having a positive refractive power,
wherein, during zooming, the first lens unit and the second lens unit move so that a distance between the first lens unit and the second lens unit changes,
wherein the first lens unit includes a negative lens, a negative lens and a positive lens that are disposed in this order from the object side to the image side, and the second lens unit includes a positive lens, a positive lens, a negative lens and a positive lens that are disposed in this order from the object side to the image side,
wherein the zoom lens performs focusing by moving the first lens unit,
wherein the zoom lens further comprises an aperture stop disposed between the first lens unit and the second lens unit, and
wherein the zoom lens satisfies conditional expressions $4.18 \leq TLw/BFw < 12.0$, $0.20 < f2/ft < 0.90$, $-1.30 < f1/f2 < -0.20$, where $TLw$ is a total length of the zoom lens at a wide angle end, $BFw$ is a back focal length at the wide angle end, $ft$ is a focal length of the zoom lens at a telephoto end, $f1$ is a focal length of the first lens unit, $f2$ is a focal length of the second lens unit, and
wherein at least one positive lens included in the first lens unit satisfies conditional expression:

$1.86 < Nd < 3.00$, where $Nd$ is a refractive index of a material of a positive lens included in the first lens unit.

8. The image pickup apparatus according to claim 7, further comprising:
   a correction unit configured to correct an aberration of the zoom lens by performing image processing.

* * * * *